A. M. LATHAM.
FORK FOR EATING CORN ON THE COB.
APPLICATION FILED AUG. 25, 1910.

1,002,998.  Patented Sept. 12, 1911.

Witnesses:

Inventor:

UNITED STATES PATENT OFFICE.

ANNA M. LATHAM, OF PORTLAND, MAINE.

FORK FOR EATING CORN ON THE COB.

1,002,998. Specification of Letters Patent. Patented Sept. 12, 1911.

Application filed August 25, 1910. Serial No. 578,943.

*To all whom it may concern:*

Be it known that I, ANNA M. LATHAM, of Portland, in the county of Cumberland and State of Maine, have invented certain new and useful Improvements in Forks for Eating Corn on the Cob, of which the following is a specification.

My invention relates to forks adapted to be used for eating green corn on the cob.

The difficulty of eating green corn on the cob is well known and the object of my invention is to devise a table implement whereby the corn may be neatly and thoroughly removed from the cob and eaten.

The invention consists essentially of placing in the rear of the ordinary tines of a fork a set of auxiliary or secondary tines which serve as scrapers to remove the soft portions of the corn after the main body of the kernels has been removed by the main tines. These auxiliary tines are preferably made with chisel edges and they project forward from a transverse bar which unites the main tines.

Figure 1:
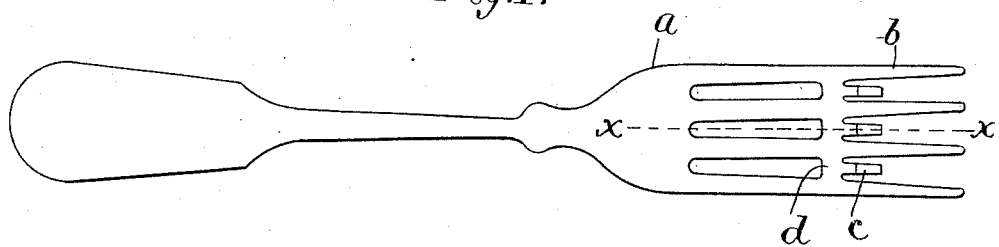
Figure 2:
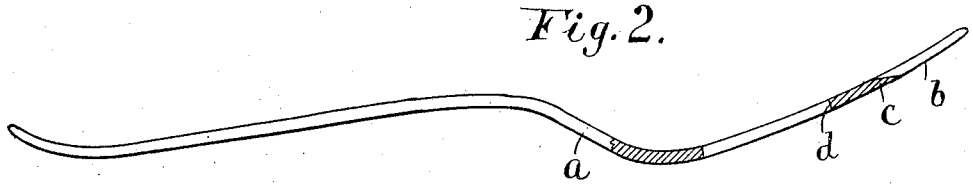

I illustrate my invention by means of the accompanying drawing in which,

Figure 1 is a plan of my fork. Fig. 2 is an edge view with a portion in section on the line $x$—$x$ of Fig. 1, and Fig. 3 is a longitudinal section through an ear of corn showing the action of my fork.

In the drawing, $a$ represents the fork proper and $b$ are the main or ordinary tines. The auxiliary tines or scrapers $c$ are located between the main tines, their points being a considerable distance in the rear of the points of the main tines. The tines $c$ are provided as here shown, with chisel edges to act as scrapers and they extend forward from the bars or webs $d$ which unite the main tines.

The fork in rear of the tines $c$ is here shown as being separated into tines in the regular manner of a fork but this portion of the implement may if desired be made solid or hollowed out to form a bowl.

When the implement is used the tines $b$ are thrust through the kernels lengthwise of the ear and parallel with the surface of the ear. The tines $b$ loosen and release the main portion of the kernels while the auxiliary tines $c$ scrape up the soft pits which are left behind. The tines $b$ have a further and most important function, and that is, they serve to hold the scrapers steady and prevent them from cutting into the cob or slipping up out of contact with the kernels. The scrapers in order to do proper work, should move in close contact with the surface of the cob but should not be allowed to dip downward to catch into the cob or to pass up through the tops of the kernels. They are designed to remove the tender delicate pits of the kernels which are next to the cob and which remain after the tops of the kernels are removed. The main tines act as guides to hold the scrapers in position. They penetrate several rows of kernels while the latter are yet partially fixed in the cob and so exert a steadying effect on the scrapers.

In using my fork, the tines are as above stated, thrust through the kernels moving parallel with the surface of the cob and this motion may be made steady and continuous until the fork is filled with corn and without any danger of the scrapers catching into the body of the cob. The tines $a$ thus act not only to partially loosen the kernels so that they are easily taken off by the scrapers but they also act to steady the scrapers and hold them in place. All the edible portion of the corn is thus collected on the fork in sufficient quantity to form a mouthful and the corn is thus eaten in the ordinary way.

An implement made in this manner provides a convenient and handy device for eating corn on the cob and makes it practical to eat such corn for people who object to gnawing it in the usual manner.

While I have shown the auxiliary tines as made with chisel edges they may be made pointed or otherwise terminated.

I claim:

A fork for eating green corn including a set of guiding and loosening tines and a set of scraping tines alternating and in the same plane therewith, said scraping tines having scraping points in rear of the points of the said guiding and loosening tines.

In testimony whereof I have affixed my signature in presence of two witnesses.

ANNA M. LATHAM.

Witnesses:
PERCY M. ANDREWS,
S. W. BATES.